(12) United States Patent
Takekawa

(10) Patent No.: US 6,823,481 B2
(45) Date of Patent: Nov. 23, 2004

(54) OPTICAL COORDINATE INPUT/ DETECTION DEVICE WITH OPTICAL-UNIT POSITIONING ERROR CORRECTING FUNCTION

(75) Inventor: Kenichi Takekawa, Aichi (JP)

(73) Assignee: Ricoh Company, Ltd., Tokyo (JP)

( * ) Notice: Subject to any disclaimer, the term of this patent is extended or adjusted under 35 U.S.C. 154(b) by 672 days.

(21) Appl. No.: 09/799,018

(22) Filed: Mar. 6, 2001

(65) Prior Publication Data

US 2001/0019325 A1 Sep. 6, 2001

(30) Foreign Application Priority Data

Mar. 6, 2000 (JP) ........................................ 2000-059917

(51) Int. Cl.$^7$ ................................................ G06F 11/00
(52) U.S. Cl. ........................................ 714/48; 345/173
(58) Field of Search .................. 714/48, 812; 345/704, 345/181, 183, 173, 162, 157, 104

(56) References Cited

U.S. PATENT DOCUMENTS

| 5,491,706 A | * | 2/1996 | Tagawa et al. ............. 714/812 |
| 5,583,323 A | | 12/1996 | Zurstadt et al. |
| 5,631,666 A | * | 5/1997 | Tagawa et al. ............. 345/104 |
| 5,945,973 A | * | 8/1999 | Sakai et al. ................. 345/104 |
| 6,137,482 A | * | 10/2000 | Kim ........................... 345/179 |
| 6,236,386 B1 | * | 5/2001 | Watanabe .................... 345/98 |

FOREIGN PATENT DOCUMENTS

| EP | 0 362 109 | | 4/1990 |
| GB | 2 204 126 | | 11/1988 |
| JP | 11-110116 | * | 4/1999 |

* cited by examiner

Primary Examiner—Robert Beausoliel
Assistant Examiner—Christopher S. McCarthy
(74) Attorney, Agent, or Firm—Oblon, Spivak, McClelland, Maier & Neustadt, P.C.

(57) ABSTRACT

A coordinate input/detection device compares a waveform of a signal corresponding to intensity distribution of rays received from a coordinate input area by a light-receiving unit and a standard waveform at fixed timing. If the waveform is not equal to the standard waveform, the coordinate input/detection device determines that an installation position of the light-receiving unit is off a correct position because of shock or vibration, and obtains a new standard waveform and stores the new standard waveform in a storage unit, thereby setting the waveform of the signal corresponding to the intensity distribution of rays received by the light-receiving unit located at an incorrect position as the standard waveform. Accordingly, there is no error in relative positions of a peak point corresponding to a standard mark, that is, a standard for detecting coordinates of a pointing instrument in the coordinate input area, and a peak point corresponding to the pointing instrument in the intensity distribution, thereby preventing misdetection of the coordinates.

19 Claims, 11 Drawing Sheets

OPTICAL COORDINATE INPUT/DETECTION DEVICE WITH OPTICAL-UNIT POSITIONING ERROR CORRECTING FUNCTION

BACKGROUND OF THE INVENTION

1. Field of the Invention

The present invention relates to a coordinate input/detection device detecting coordinates of a pointing instrument such as a pen and a fingertip for inputting or selecting information. More particularly, the present invention relates to an optical coordinate input/detection device detecting coordinates of a pointing instrument such as a pen and a fingertip inserted to a coordinate input area for inputting or selecting information, an electronic blackboard system mainly including the optical coordinate input/detection device, a method of correcting a positioning error of a light-receiving unit included in the optical coordinate input/detection device, and a recording medium storing a program readable by a computer, the program making the computer execute the method.

2. Description of the Related Art

An electronic blackboard device has been known as a device that can read handwriting information written by use of a writing instrument on a writing surface such as a whiteboard or a sheet of paper, by an exclusive scanner, and that can print the handwriting information on a recording sheet by an exclusive printer. Additionally, a recently introduced electronic blackboard system provides a coordinate input/detection device on a writing surface of an electronic blackboard device, thereby enabling input of handwriting information written on the writing surface to a computer such as a personal computer in real time. For example, the Soft Board manufactured by Microfield Graphics, Inc. is a device that enables input of visual data such as a letter or and a picture written on a whiteboard to a computer in real time by including a coordinate input/detection device on the whiteboard. Thus, an electronic blackboard system utilizing the Soft Board can display visual data scanned by the Soft Board on a CRT (Cathode Ray Tube) by inputting the visual data to a computer, can display the visual data on a large-scale screen using a liquid crystal projector, and can print the visual data on a recording sheet by use of a printer. Additionally, such an electronic blackboard system can project an image displayed on a monitor of the computer connected to the Soft Board on the Soft Board by use of the liquid crystal projector, and can operate the computer on the Soft Board.

Additionally, an electronic blackboard system has been introduced, the electronic blackboard system including a display device displaying letters and images, a coordinate input/detection device providing a coordinated input surface, that is, a touch panel, on a top of the display device, and a control device controlling a displaying function of the display device based on an input signal from the coordinate input/detection device, in which the display device and the coordinate input/detection device form a displaying surface and a writing surface of the electronic blackboard system. For example, the Smart 2000 manufactured by SMART Technologies, Inc. inputs handwriting information to a computer by using a coordinate input/detection device as a writing surface provided on a top of a projecting or displaying surface of a panel while projecting image information including letters, pictures, diagrams, graphics on the panel by use of a liquid crystal projector connected to the computer. The Smart 2000, then combines the handwriting information and the image information in the computer, and displays the combined information on the projecting surface in real time through the liquid crystal projector. An electronic blackboard system such as the Smart 2000 and the like can display an image inputted by use of a coordinate input/detection device as a rewriting image on a top of an image being displayed on a monitor of a display device, and thus the electronic blackboard system has already been utilized in wide areas such as a meeting, a presentation and an educational scene, obtaining high evaluation for its effectiveness. Additionally, the electronic blackboard system is also used as an electronic conference system by including a communication function transmitting, for instance, sounds and images, and by connecting remote places with each other by use of communication lines.

Recently, various methods of inputting and detecting coordinates are considered as coordinate input/detection devices utilized in the above-described electronic blackboard systems. A coordinate input/detection device enabling input of information without providing a physical coordinate input surface such as a touch panel, for instance, an optical coordinate input/detection device is considered as one of appropriate coordinate input/detection devices applied to the above-described electronic blackboard systems. One of suggested optical coordinate input/detection devices is an optical coordinate input/detection device disclosed in Japanese Laid-Open Patent Application No. 11-110116. This optical coordinate input/detection device scans a laser beam emitted from a light source provided in each of two optical units by using a polygonal mirror, and reflects the laser beam by use of a retro reflector in a coordinate input/detection area. In a case in which a pointing instrument such as a finger or a pen is inserted to the coordinate input/detection area blocks the laser beam in the area, the optical coordinate input/detection device obtains a pulse number of a pulse motor rotating the polygonal mirror, based on light-intensity distribution at a light-receiving device provided in each of the optical units, calculates an emission angle of the laser beam blocked by pointing instrument corresponding to the pulse number for each optical unit, and determines coordinates of the pointing instrument in the coordinate input/detection area by triangulating the emission angle of the laser beam emitted from each of the optical units. The above-described optical coordinate input/detection device not including a physical surface has high visibility even when equipped on a displaying monitor of a displaying device. In addition, enlargement of the optical coordinate input/detection device is comparatively easy.

Since the above-described optical coordinate input/detection device performs triangulation based on emission angles of blocked laser beams, installation positions (installation angles) of the optical units (the light-receiving devices) are significant. Thus, errors in setting the installation angles should be corrected, based on a contraction rate and the installation positions (the installation angles) that are detected when the optical coordinate input/detection device is powered on, since the optical coordinate input/detection device detects a pointing instrument at incorrect coordinates if the errors occur on the installation positions of the optical units. However, an electronic blackboard system including the optical coordinate input/detection device is often moved being powered in regular operations. During the movement of the electronic blackboard system, adjustment of the optical units is slanted occasionally by vibration and shock caused by hitting the system to an object. Furthermore, the adjustment of the optical units is slanted occasionally by vibration caused by pointing the coordinate input/detection area strongly by the pointing instrument.

SUMMARY OF THE INVENTION

Accordingly, it is a general object of the present invention to provide a method and apparatus for preventing misdetection of coordinates of a pointing instrument. A more particular object of the present invention is to provide a coordinate input/detection device, an electronic blackboard system, a method of correcting an error in an installation position (an installation angle) of an optical unit (a light-receiving unit), and a recording medium, by which misdetection of coordinates of a pointing instrument can be prevented, the misdetection being caused by the error in the installation position of the light-receiving unit.

The above-described object of the present invention is achieved by a coordinate input/detection device provided with a coordinate input area, including a light-emitting unit emitting a plurality of rays to the coordinate input area; a light-receiving unit receiving the plurality of rays reflected by sides of the coordinate input area, and obtaining intensity distribution of the plurality of rays; a coordinate detection unit detecting coordinates of a pointing instrument inserted to the coordinate input area, based on the intensity distribution; a standard mark provided at a fixed position in the coordinate input area so that the light-receiving unit generates a peak intensity corresponding to a ray reflected at the standard mark in the intensity distribution; and an error detection unit detecting a positioning error of the light-receiving unit by detecting a shift in a position of the peak intensity in the intensity distribution at fixed timing.

The above-described object of the present invention is also achieved by an electronic blackboard system including an electronic blackboard unit whose displaying surface and writing surface include a displaying unit and a coordinate input/detection unit respectively; and a control unit executing a displaying control of the displaying unit based on a signal outputted from the coordinate input/detection unit, wherein the coordinate input/detection unit includes a coordinate input area corresponding to a displaying surface of the displaying unit; a light-emitting unit emitting a plurality of rays to the coordinate input area; a light-receiving unit receiving the plurality of rays reflected by sides of the coordinate input area, thereby obtaining intensity distribution of the plurality of rays, and outputting the signal corresponding to the intensity distribution; a standard mark provided at a fixed position in the coordinate input area so that the light-receiving unit generates a peak intensity corresponding to a ray reflected at the standard mark in the intensity distribution; a coordinate detection unit detecting coordinates of a pointing instrument inserted to the coordinate input area, in accordance with a position of the peak intensity in the intensity distribution; a storage unit; a standard-waveform storing unit storing a first waveform of the signal including the peak point as a standard waveform in the storage unit; a waveform comparing unit comparing a second waveform of the signal with the standard waveform at fixed timing, wherein the standard-waveform storing unit stores a new waveform of the signal outputted by the light-receiving unit as the standard waveform in the storage unit in a case in which the second waveform is not equal to the standard waveform.

The above-described object of the present invention is also achieved by a method of correcting a positioning error of a light-receiving unit included in a coordinate input/detection device provided with a coordinate input area, the coordinate input/detection device including a light-emitting unit emitting a plurality of rays to the coordinate input area; the light-receiving unit receiving the plurality of rays reflected by sides of the coordinate input area, thereby obtaining intensity distribution of the plurality of rays, and outputting a signal corresponding to the intensity distribution; a standard mark provided at a fixed position in the coordinate input area so that the light-receiving unit generates a peak intensity corresponding to a ray reflected at the standard mark in the intensity distribution; a coordinate detection unit detecting coordinates of a pointing instrument inserted to the coordinate input area, in accordance with a position of the peak intensity in the intensity distribution; and a storage unit, the method including the steps of storing a first waveform of the signal including the peak point as a standard waveform in the storage unit; comparing a second waveform of the signal with the standard waveform at fixed timing; and storing a new waveform of the signal outputted by the light-receiving unit as the standard waveform in the storage unit in a case in which the second waveform is not equal to the standard waveform.

The above-described object of the present invention is also achieved by a recording medium readable by a coordinate input/detection device, tangibly embodying a program of instructions executable by the coordinate input/detection device to correct a positioning error of a light-receiving unit included in the coordinate input/detection device provided with a coordinate input area, the coordinate input/detection device including a light-emitting unit emitting a plurality of rays to the coordinate input area; the light-receiving unit receiving the plurality of rays reflected by sides of the coordinate input area, thereby obtaining intensity distribution of the plurality of rays, and outputting a signal corresponding to the intensity distribution; a standard mark provided at a fixed position in the coordinate input area so that the light-receiving unit generates a peak intensity corresponding to a ray reflected at the standard mark in the intensity distribution; a coordinate detection unit detecting coordinates of a pointing instrument inserted to the coordinate input area, in accordance with a position of the peak intensity in the intensity distribution; and a storage unit, the program including the steps of storing a first waveform of the signal including the peak point as a standard waveform in the storage unit; comparing a second waveform of the signal with the standard waveform at fixed timing; and storing a new waveform of the signal outputted by the light-receiving unit as the standard waveform in the storage unit in a case in which the second waveform is not equal to the standard waveform.

The coordinate input/detection device compares a waveform of a signal corresponding to intensity distribution of rays received from the coordinate input area by the light-receiving unit and a standard waveform at fixed timing. If the waveform is not equal to the standard waveform, the coordinate input/detection device determines that an installation position of the light-receiving unit is off a correct position because of shock or vibration, and obtains a new standard waveform and stores the new standard waveform in the storage unit, thereby setting the waveform of the signal corresponding to the intensity distribution of rays received by the light-receiving unit located at an incorrect position as the standard waveform. Accordingly, there is no error in relative positions of a peak point corresponding to the standard mark, that is, a standard for detecting coordinates of a pointing instrument in the coordinate input area, and a peak point corresponding to the pointing instrument in the intensity distribution, thereby preventing misdetection of the coordinates.

DESCRIPTION OF THE PREFERRED EMBODIMENTS

A description will now be given of preferred embodiments of the present invention, with reference to the accompanying drawings.

Figure 1:
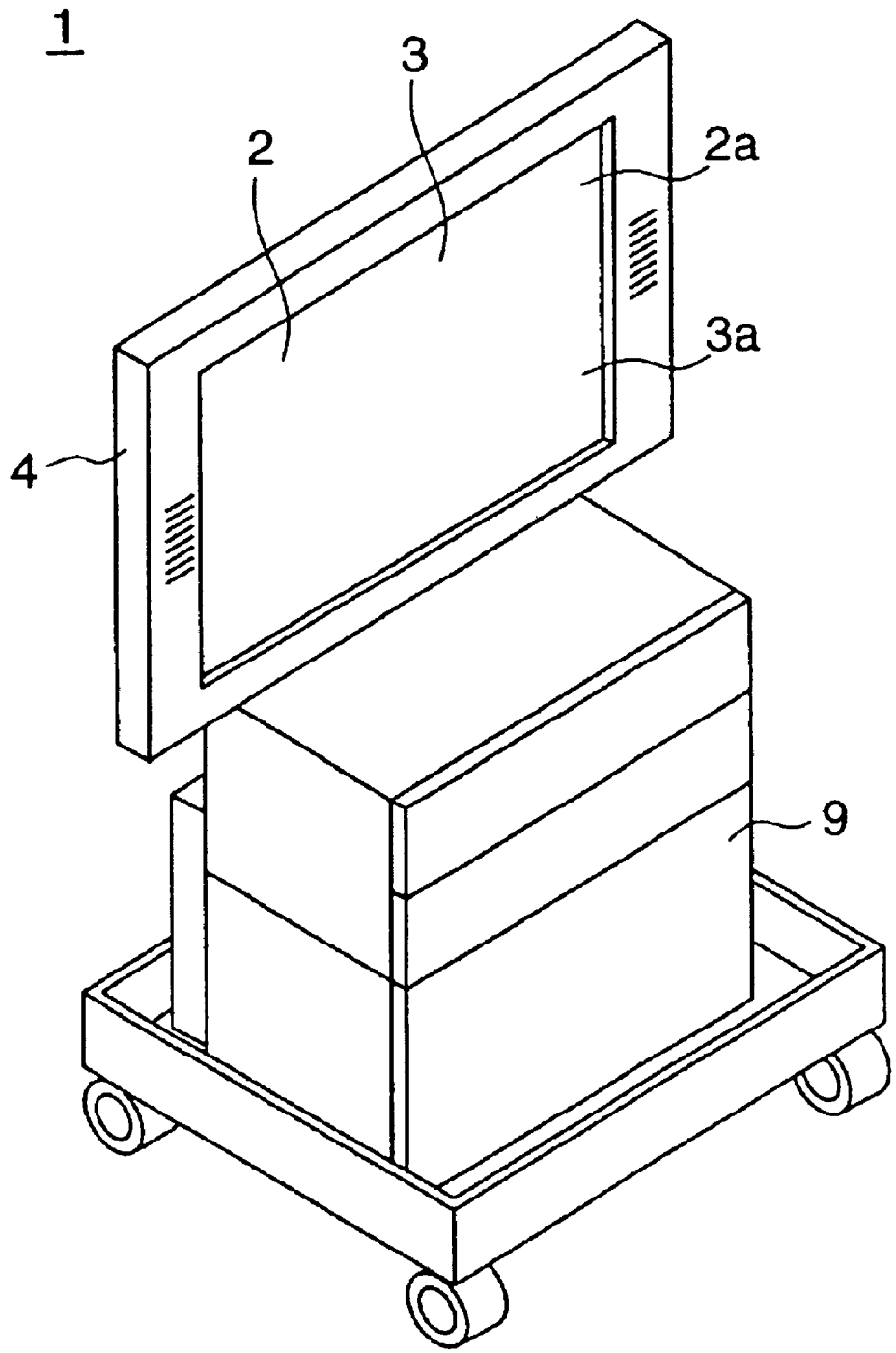
FIG. 1 is a squint diagram showing a summarized outward appearance of an electronic blackboard system according to a first embodiment of the present invention.
Figure 2:
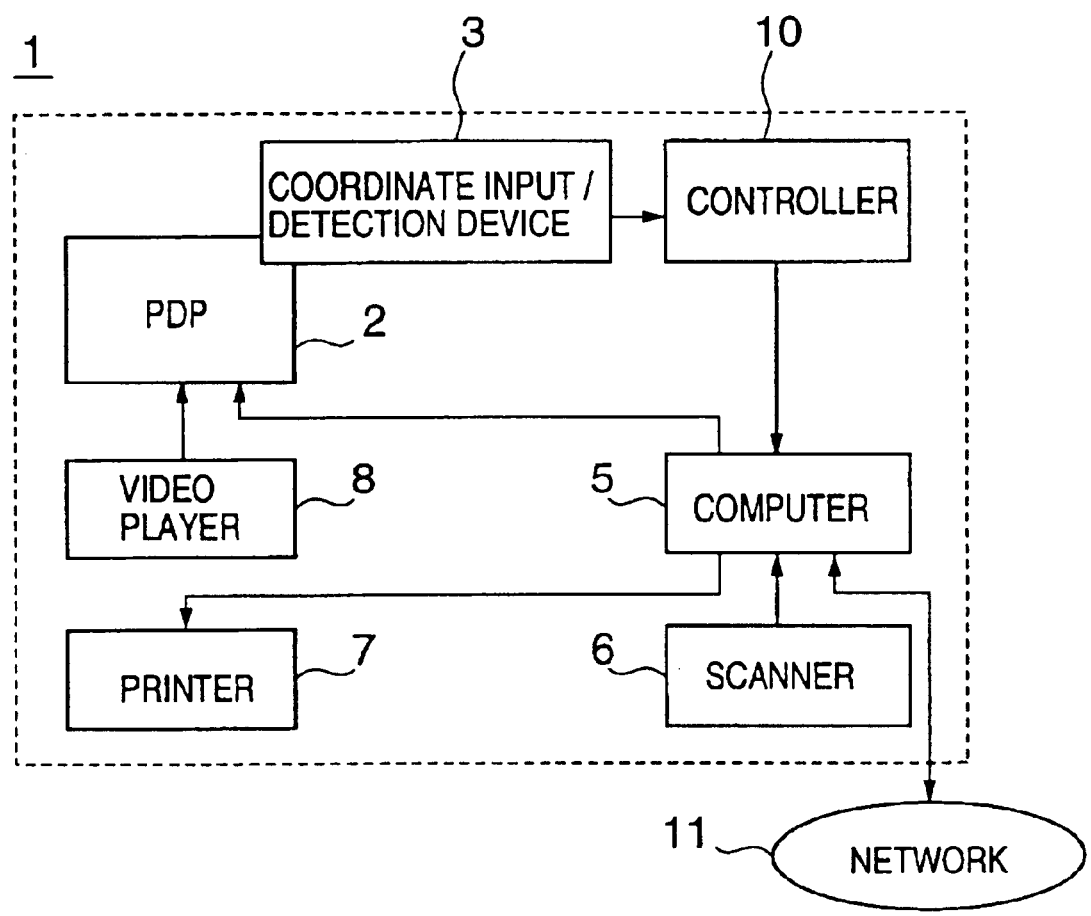
FIG. 2 is a block diagram showing an electrical connection of each unit included in the electronic blackboard system.

FIG. 1 is a squint diagram showing a summarized outward appearance of an electronic blackboard system 1 according to a first embodiment of the present invention. The electronic blackboard system 1 shown in FIG. 1 mainly includes an electronic blackboard unit 4 and an equipment storage unit 9. The electronic blackboard unit 4 includes a PDP (Plasma Display Panel) 2 and a coordinate input/detection device 3. The PDP 2 is a large-sized PDP to be used as an electronic blackboard. The coordinate input/detection device 3 is an optical coordinate input/detection device that includes a coordinate input/detection area 3a formed by a film of rays emitted in a fan shape (a plane in which rays are radiating from a light source as a center), and enables input of information such as letters, by taking the steps of blocking a bundle of rays in the coordinate input/detection area 3a by inserting a pointing instrument P shown in FIG. 7 such as a fingertip or a pen to the coordinate input/detection area 3a, and by detecting coordinates of the pointing instrument P based on imagery positions at a light-receiving device 39 shown in FIG. 5 such as a CCD (Charge Coupled Device). A detailed description of the optical coordinate input/detection device will be given later. The equipment storage unit 9 includes a computer 5, a scanner 6, a printer 7 and a video player 8, which are shown in FIG. 2. The computer 5 is, for example, a personal computer as a control device. The scanner 6 is provided for reading an image on a document. The printer 7 is used for printing out image data on a record sheet.

The PDP 2 and the coordinate input/detection device 3 are unified in the electronic blackboard unit 4 so that the coordinate input/detection area 3a of the coordinate input/detection device 3 corresponds to a displaying surface 2a of the PDP 2, as shown in FIG. 1. As described above, the electronic blackboard unit 4 forms a displaying surface of the electronic blackboard system 1 by use of the displaying surface 2a of the PDP 2, and a writing surface of the electronic blackboard system 1 by use of the coordinate input/detection area 3a of the coordinate input/detection device 3. Additionally, the PDP 2 includes, for example, video input terminals and speakers not shown in figures, and can be used as a large-sized monitor by being connected to various information and AV equipments including the video player 8, a laser disk player, a DVD player and a video camera. The PDP 2 further includes an adjustment function not shown in the figures to adjust a displaying position, a width, a height and a distortion of the PDP 2, for instance.

Next, a description will be given of an electrical connection of each unit included in the electronic blackboard system 1 with reference to FIG. 2. FIG. 2 is a block diagram showing an electrical connection of each unit included in the electronic blackboard system 1. In the electronic blackboard system 1 shown in FIG. 2, the PDP 2, the scanner 6, the printer 7, the video player 8 are connected to the computer 5 that controls the entire electronic blackboard system 1. Additionally, a controller 10 provided in the coordinate input/detection device 3 is connected to the computer 5, the controller 10 executing calculation of coordinates pointed by the pointing instrument P in the coordinate input/detection area 3a. Furthermore, the coordinate input/detection device 3 is connected to the computer 5 through the controller 10. The electronic blackboard system 1 can be connected to a network 11 through the computer 5, and thus data created by other computers connected to the network 11 can be displayed on the PDP 2 of the electronic blackboard system 1, and data created by the electronic blackboard system 1 can be transmitted to the other computers.

Figure 3:
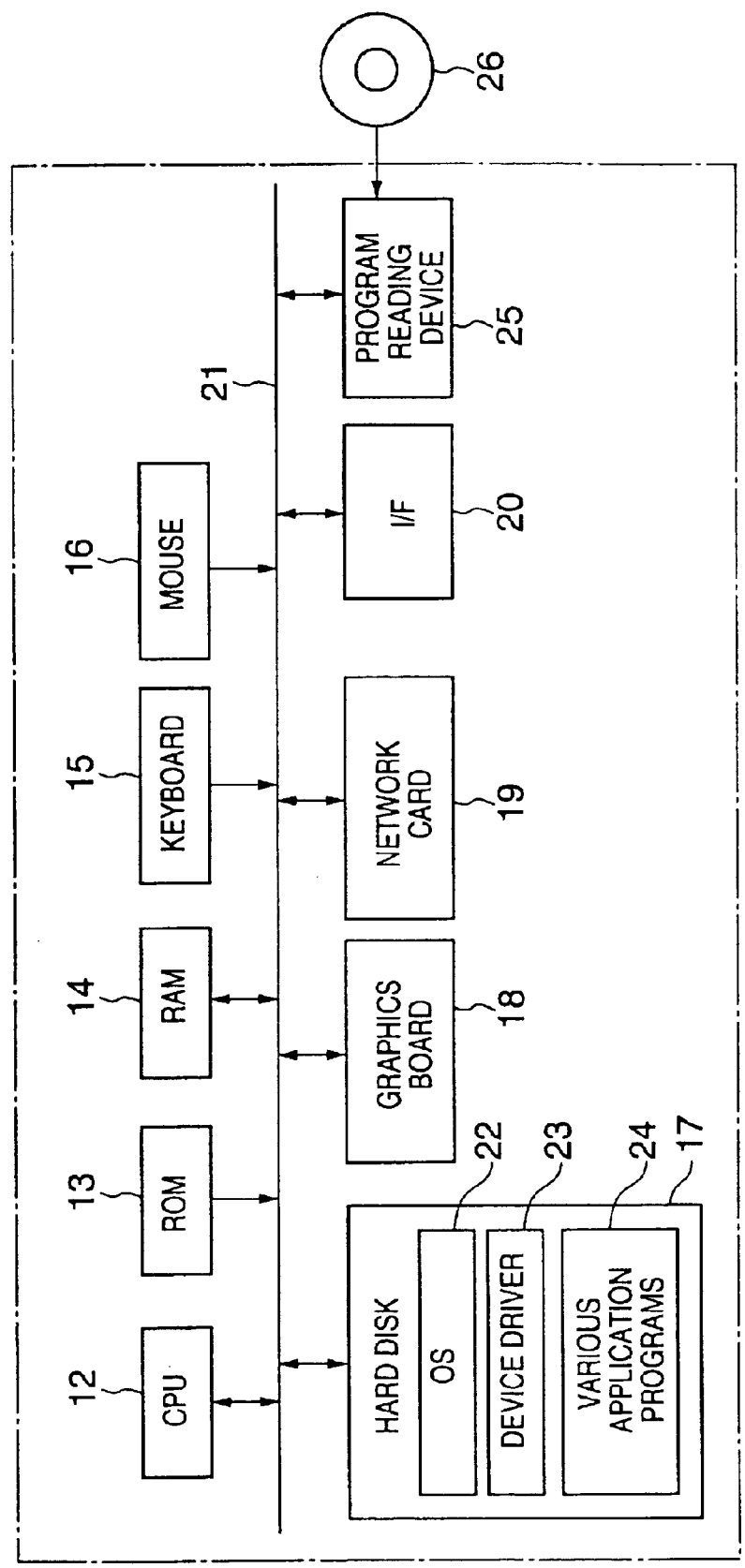
FIG. 3 is a block diagram showing an electrical connection of each unit included in a computer of the electronic blackboard system.

FIG. 3 is a block diagram showing an electrical connection of each unit included in the computer 5 of the electronic blackboard system 1. The computer 5 includes a CPU (Central Processing Unit) 12, a ROM (Read Only Memory) 13, a RAM (Random Access Memory) 14, a keyboard 15, a mouse 16, a hard disk 17, a graphics board 18, a network card (a modem) 19, an interface (I/F) 20, a bus 21 and a program reading device 25, as shown in FIG. 3. The CPU 12 controls the entire system. The ROM 13 stores, for instance, a startup program. The RAM 14 is used as a working area for the CPU 12. The keyboard 15 is used for inputting letters, numbers and various directions. The mouse 16 is used for moving a cursor and for selecting an area. The hard disk 17 stores an OS (Operating System) 22, a device driver 23 operating the coordinate input/detection device 3 on the computer 5 through the controller 10, and various application programs 24 including drawing, word-processing, table calculation and presentation software. The graphics board 18 is connected to the PDP 2, and controls displaying an image on the PDP 2. The network card 19 is used for connecting the computer 5 to the network 11. The interface 20 is connecting the controller 10, the scanner 6, the printer 7 and the like to the computer 5. The above-described units in the computer 5 are connected by the bus 21 to each other.

Additionally, the program reading device 25, for instance, a floppy disk drive, a CD-ROM drive, or an MO (Magneto Optical) drive, is provided in the computer 5 as a device reading program codes (control programs) such as the OS 22, the device driver 23 and the various application programs 24, which are stored in a recording medium 26 such as a floppy disk, a hard disk, an optical disk, an MO disk or a memory card. The optical disk includes, for instance, a CD-ROM, a CD-R, a CD-R/W, a DVD-ROM and a DVD-RAM. The various application programs 24 are executed by the CPU 12 under a control of the OS 22, which starts up in accordance with a power supply to the computer 5. For instance, in a case in which a user starts up the drawing software by a fixed operation using the keyboard 15 and the mouse 16, a fixed image based on the drawing software is displayed on the PDP 2 through the graphics board 18. Additionally, the device driver 23 also starts up with the OS 22, and becomes able to receive input data from the coordinate input/detection device 3 through the controller 10. Now, in a case in which a user writes a letter or a diagram in the coordinate input/detection area 3a by inserting the pointing instrument P thereto while the drawing software is running, coordinate information is inputted as image data based on a path of the pointing instrument P to the computer 5, and is displayed as an overwriting image on a top of an image being displayed on the PDP 2. In detail, the CPU 12 of the computer 5 creates drawing information for drawing lines and letters based on inputted image data, and writes the drawing information to a video memory (not shown in the figures) provided in the graphics board 18 with coordinates based on inputted coordinate information. Subsequently, the graphics board 18 transmits the drawing information written in the video memory to the PDP 2 as an image signal, thereby displaying the same letter or the same diagram written by the user, on the PDP 2. In other words, by recognizing the coordinate input/detection device 3 as a pointing device such as the mouse 16, the computer 5 executes processes similar to a case of writing the letter on the drawing software by use of the mouse 16, in a case of writing the letter in the coordinate input/detection area 3a of the coordinate input/detection device 3.

Figure 4:
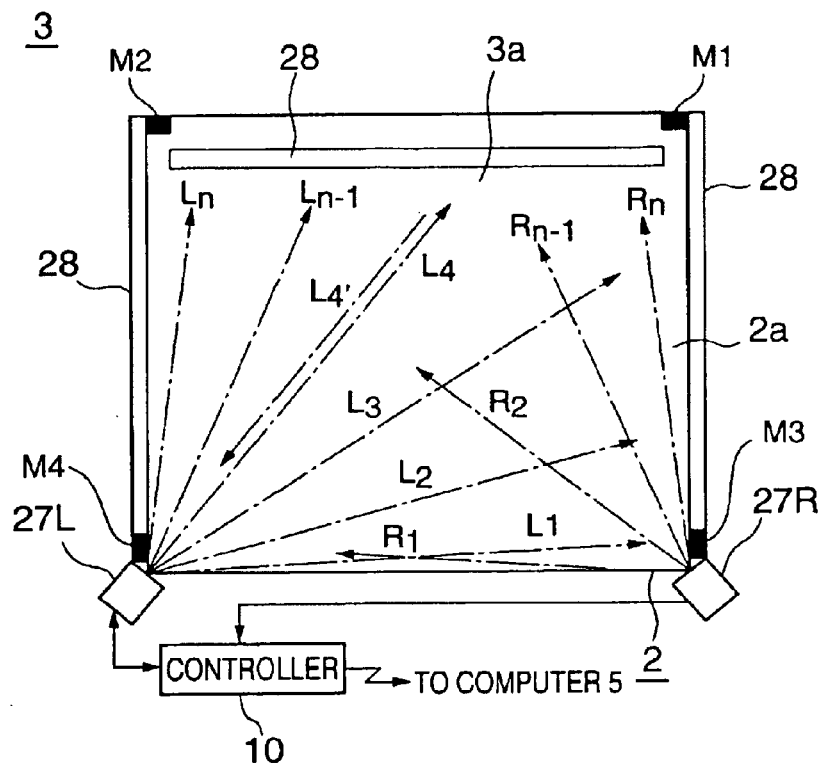
FIG. 4 is a diagram showing a summarized configuration of a coordinate input/detection device of the electronic blackboard system.

A detailed description will now be given of the coordinate input/detection device 3. FIG. 4 is a diagram showing a summarized configuration of the coordinate input/detection device 3. The coordinate input/detection device 3 has a size corresponding to a size of the displaying surface 2a of the PDP 2, and includes the quadrangle-shaped coordinate input/detection area 3a with more width than length. This coordinate input/detection area 3a is an area, which enables input of handwriting information including a letter and a diagram. Optical units 27 emitting and receiving rays, that are a left optical unit 27L and a right optical unit 27R, are provided respectively at near left and right bottom corners of the coordinate input/detection area 3a, with fixed installation angles. A flat or almost flat fan-shaped film of rays (probe rays) including $L_1$ through $L_n$ and $R_1$ through $R_n$ is emitted from the optical units 27 parallel to the displaying surface 2a of the PDP 2 so that the fan-shaped film of rays can cover the entire coordinate input/detection area 3a. Additionally, retro reflectors 28 are provided on upper, left and right sides of the coordinate input/detection area 3a. These retro reflectors 28 are formed by arrangement of a number of conical corner cubes, and have a characteristic of reflecting an incident ray to a fixed position without relying on an incident angle. For instance, a probe ray $L_4$ emitted from the left optical unit 27L is reflected by the retro reflector 28 located on the upper side of the coordinate input/detection area 3, and received by the left optical unit 27L as a retro-reflection ray $L_4'$ following a same path as the probe ray $L_4$. In other words, the retro reflectors 28 provided on the upper, left and right sides of the coordinate input/detection area 3a also form the coordinate input/detection area 3a.

The retro reflector 28 provided on the upper side of the coordinate input/detection area 3a is adjacent and perpendicular to the retro reflectors 28 provided on the left and right sides of the coordinate input/detection area 3a. However, edges of the retro reflectors 28 are not connected to each other. In other words, spaces are provided between the retro reflectors 28. Additionally, black marks M1 and M2 having low reflection rates are provided respectively in the space between the retro reflectors 28 located on the upper and right sides of the coordinate input/detection area 3a, and the space between the retro reflectors 28 located on the upper and left sides of the coordinate input/detection area 3a. Furthermore, black marks M3 and M4 having low reflection rates are provided respectively near the right optical unit 27R and the left optical unit 27L. The black marks, M1, M2, M3 and M4 provide both ends of a light-receiving area at the light-receiving unit (CCD) 39 shown in FIG. 5, the light-receiving unit 39 receiving rays in the coordinate input/detection area 3a.

Figure 5:
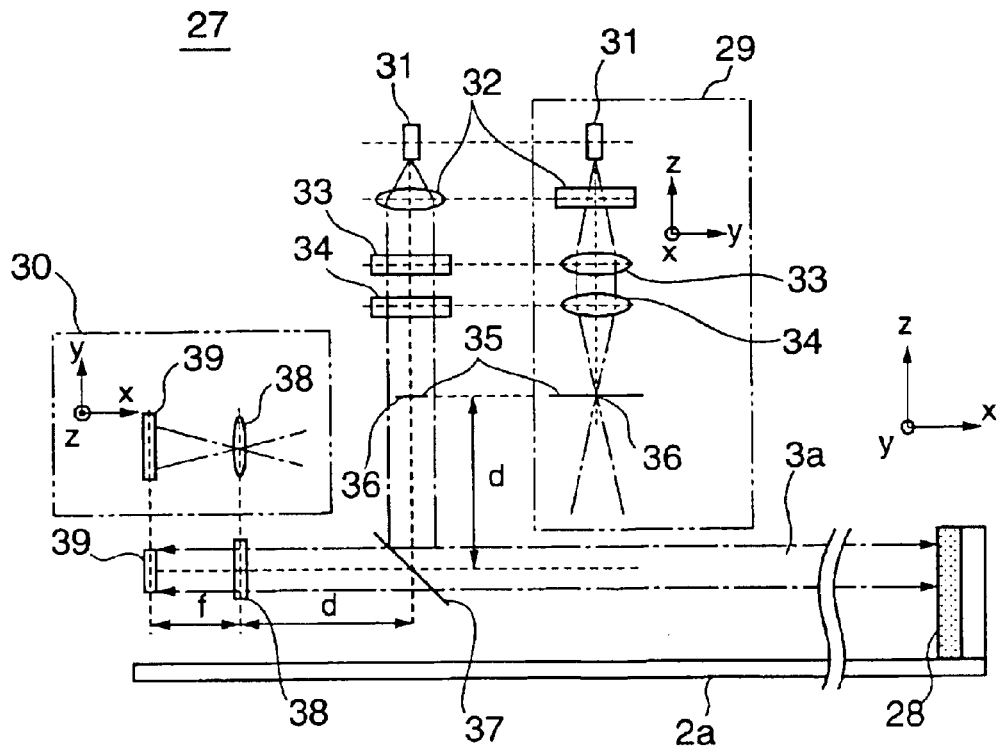
FIG. 5 is a summarized diagram showing a structure of an optical unit of the electronic blackboard system.

A description will now be given of the optical units 27. FIG. 5 is a summarized diagram showing a structure of the optical unit 27L or 27R. FIG. 5 mainly shows the structure in an x-z plane. In addition, areas surrounded by broken lines in FIG. 5 show the structure seen in an x-y plane and a y-z plane. Each optical unit 27 (27L or 27R) includes a light-emitting unit 29 and a light-receiving unit 30. The light-emitting unit 29 includes a light source 31; cylindrical lenses 32, 33 and 34; a slit plate 35 and a secondary light source 36. The light-receiving unit 30 includes a cylindrical lens 38 and the light-receiving device (CCD) 39. Light (a bundle of rays) emitted from the light source 31 perpendicularly to the displaying surface 2a of the PDP 2 is collimated in an x direction by the cylindrical lens 32, which can change a magnification of only one direction. The light collimated in the x direction by the cylindrical lens 32 is then condensed in a y direction by the cylindrical lenses 33 and 34, whose curvature distribution is perpendicular to that of the cylindrical lens 32. In other words, an area in which the light (the bundle of rays) emitted from the light source 31 is collected in a line shape is created behind the cylindrical lens 34 by functions of the cylindrical lenses 32, 33 and 34. Such an area is provided with the slit plate 35 having a slit, which is wide in the x direction and narrow in the y direction. Accordingly, the light having passed the cylindrical lenses 32, 33 and 34 forms the line-shaped secondary light source 36 at the slit of the slit plate 35. The light emitted from the secondary light source 36 is reflected by a half mirror 37 shown in FIG. 5, and moves parallel to the displaying surface 2a of the PDP 2 but not perpendicular to the displaying surface 2a, to the coordinate input/detection area 3a, being a fan-shaped film of rays whose center is the secondary light source 36. In other words, the fan-shaped film of rays generated by a light-collecting system form the coordinate input/detection area 3a, the light-collecting system including the slit plate 35 and the cylindrical lenses 32, 33 and 34. The fan-shaped film of rays moving in the coordinate input/detection area 3a is retro-reflected by the retro reflectors 28 provided on the sides of the coordinate input/detection area 3a, and returns through the same path to the half mirror 37. Thus, the fan-shaped film of rays retro-reflected by the retro reflectors 28 also forms the coordinate input/detection area 3a.

The rays retro-reflected by the retro reflectors 28 and come back to the half mirror 37 penetrate through the half mirror 37 to the light-receiving unit 30. The rays entering the light-receiving unit 30 form a line-shaped bundle of rays by the cylindrical lens 38 as a light-collecting lens, and are received by the CCD 39 provided at a distance "f" away from the cylindrical lens 38, the focal length of the cylindrical lens being the "f". It should be noted that each probe ray included in the line-shaped bundle of rays is received by the CCD 39 at a position corresponding to the probe ray. The CCD 39 is a one-dimensional CCD, and includes 2048 pixels, in the first embodiment. To be concrete, the rays retro-reflected by the retro reflectors 28 reach the CCD 39 being collimated and not being affected in a z direction by the cylindrical lens 38. Additionally, the retro-reflected rays are carried in a direction parallel to the displaying surface 2a of the PDP 2 so that the retro-reflected rays are collected at a center of the cylindrical lens 38, and thus the retro-reflected rays are affected by the cylindrical lens 38, and form an image on the CCD 39 located on a focal surface of the cylindrical lens 38. Consequently, light-intensity distribution is formed on the CCD 39 depending on existence of the retro-reflected rays. In other words, in a case in which a user blocks a retro-reflected ray by using the pointing instrument P, a point having a low intensity, that is, a later-described peak point, is created on the CCD 39, the point corresponding to the blocked retro-reflected ray. The CCD 39 having received the retro-reflected rays generates an electrical signal based on the light-intensity distribution of the retro-reflected rays, and outputs to the controller 10. It should be noted that the secondary light source 36 and the cylindrical lens 38 are both placed at a distance "d" away from the half mirror 37, and thus are at conjugate positions.

Figure 6:
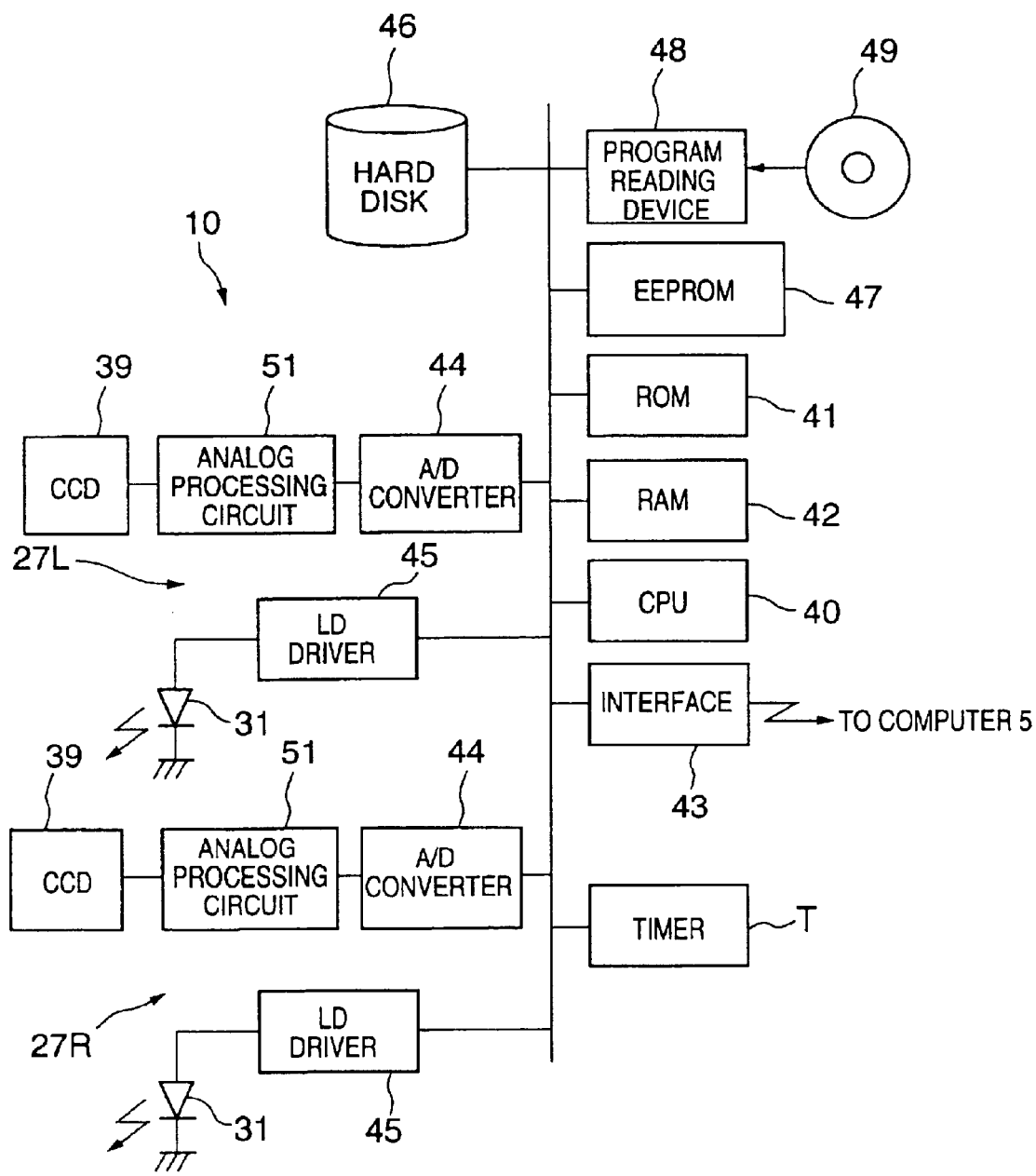
FIG. 6 is a block diagram showing a structure of a controller of the electronic blackboard system.

FIG. 6 is a block diagram showing a structure of the controller 10. The controller 10 receives the electrical signal based on the light-intensity distribution of the retro-reflected rays from the CCD (light-receiving device) 39, and executes a process to specify coordinates of a position at which a ray moving inside the coordinate input/detection area 3a is blocked by the pointing instrument P. Additionally, the controller 10 executes light emission control of the light source (LD) 31, and calculation based on an output signal of the CCD 39, the light source 31 and the CCD 39 being provided in each of the left optical unit 27L and the right optical unit 27R. The controller 10 shown in FIG. 6 includes a CPU 40, a ROM 41, a RAM 42, an interface 43, an A/D (Analog/Digital) converter 44, an LD driver 45, a hard disk 46, an EEPROM (Electrically Erasable Programmable Read Only Memory) 47, a program reading device 48, an analog processing circuit 51 and a timer T. The CPU 40 intensively controls each unit in the controller 10. The ROM 41 stores programs and data. The RAM 42 functions as a rewritable work area storing various data. The interface 43 connects the controller 10 to the computer 5. Additionally, the hard disk 46 stores various program codes or control programs therein. The EEPROM 47 functions as a waveform storing unit. The above-described units in the controller 10 are connected to each other by a bus. Furthermore, the program reading device 48 such as a floppy disk drive equipment, a CD-ROM drive equipment, or an MO drive equipment is connected to a micro computer including the CPU 40, the ROM 41 and the RAM 42, for reading various program codes or control programs stored in a recording medium 49 such as a floppy disk, a hard disk, an optical disk, an MO disk and a memory card, the optical disk including a CD-ROM, a CD-R, a CD-R/W, a DVD-ROM and a DVD-RAM disk.

The analog processing circuit 51 is connected to an output terminal of the CCD 39, as shown in FIG. 6, for calculating an output signal of the CCD 39. Retro-reflected rays having entered the CCD 39 are converted to analog image data having voltages, each voltage corresponding an intensity of each retro-reflected ray received by the CCD 39, and are outputted as an analog signal to the analog processing circuit 51 of the controller 10. Subsequently, the analog signal is received and processed by the analog processing circuit 51, and then is converted to a digital signal by the A/D converter 44. The digital signal is supplied to the CPU 40, which calculates two-dimensional coordinates of the pointing instrument P based on the digital signal. Various program codes or control programs stored in the hard disk 46 and the recording medium 49 are written in the RAM 42 when the controller 10 is powered on, and are executed by the controller 10.

Figure 7:
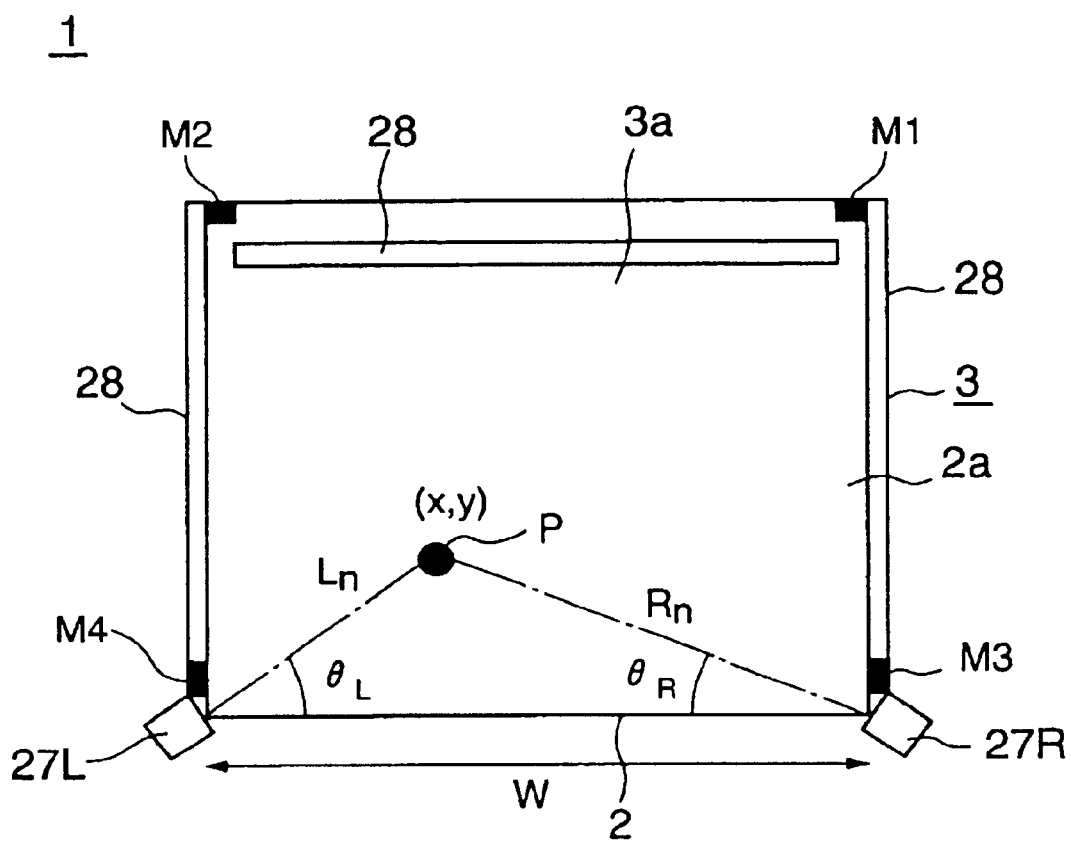
FIG. 7 is a diagram showing a front view of a point pointed by a pointing instrument in a coordinate input/detection area of the coordinate input/detection device.
Figure 8:
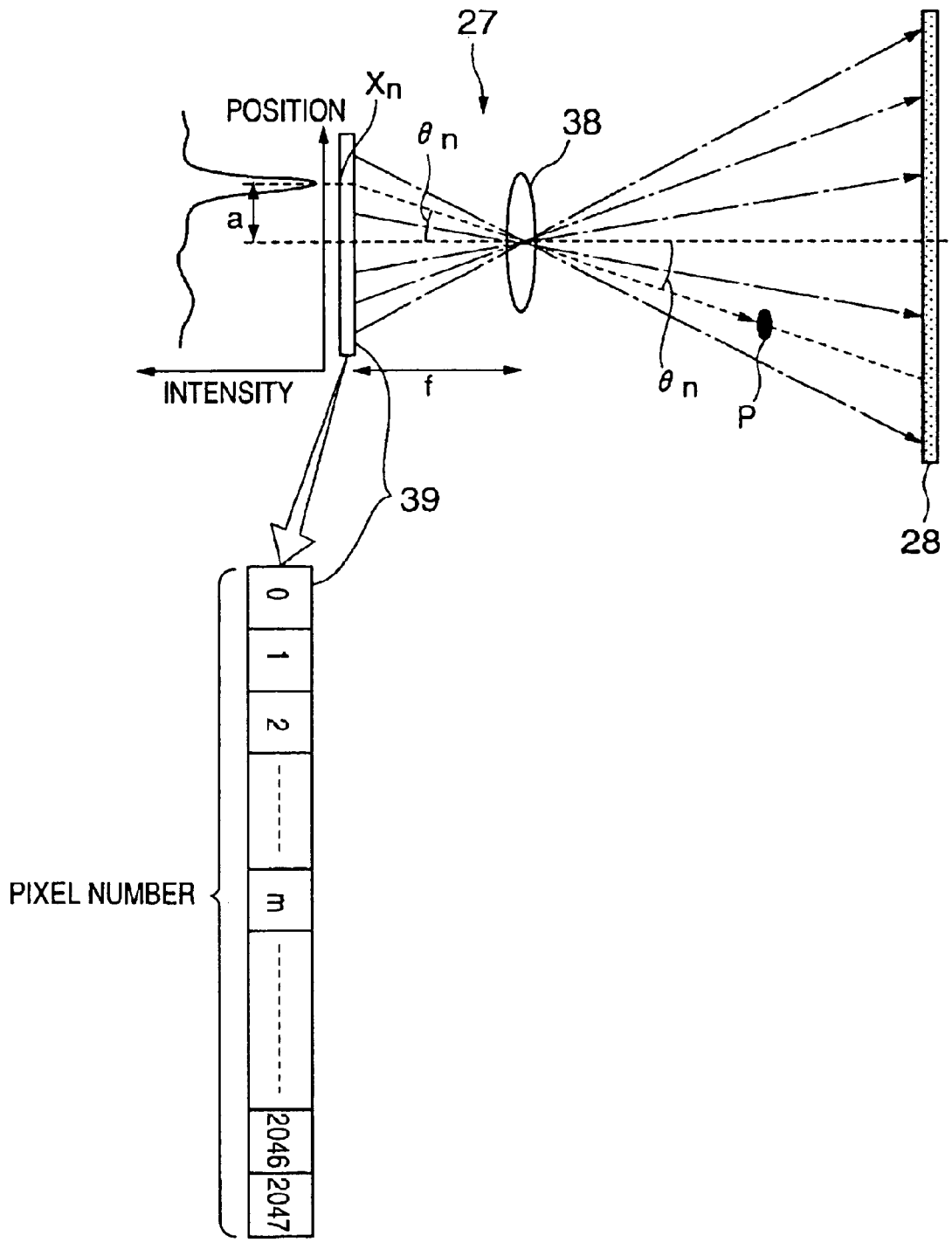
FIG. 8 is a diagram showing a coordinate detection process of a CCD (a light-receiving device) of the optical unit.

A description will now be given of functions executed by the CPU 40 of the controller 10 based on control programs. Initially, a concrete description will be given of a coordinate detection process as one of functions executed by the coordinate input/detection device 3. FIG. 7 is a diagram showing a front view of a point pointed by the pointing instrument P in the coordinate input/detection area 3a of the coordinate input/detection device 3. In a case in which the probe ray $L_n$ among the plurality of rays $L_1$ through $L_n$ emitted from the left optical unit 27L in the fan shape is blocked by the pointing instrument P, the probe ray $L_n$ does not reach the retro reflectors 28, as shown in FIG. 7. Similarly, the probe ray $R_n$ does not reach the retro reflectors 28. In such a case, light-intensity distribution on the CCD 39 is considered. FIG. 8 is a diagram showing a coordinate detection process of the CCD 39. If the pointing instrument P is not inserted to the coordinate input/detection area 3a, the light-intensity distribution on the CCD 39 is almost even throughout the CCD 39. However, if the probe ray $L_n$ is blocked by the pointing instrument P inserted to the coordinate input/detection area 3a as shown in FIG. 7, the probe ray $L_n$ is not received by the CCD 39 of the left optical unit 27L, and thus a fixed position $X_n$ on the CCD 39 becomes an area with a low intensity (a dark point), the fixed position $X_n$ corresponding to the probe ray $L_n$. The position $X_n$ as the area with the low intensity appears as a peak point in an intensity waveform outputted from the CCD 39. Accordingly, the CPU 40 of the controller 10 recognizes appearance of such a peak point in the intensity waveform by detecting a change in a voltage, and detects the position $X_n$ as the peak point. After detecting the position $X_n$, the CPU 40 detects a distance "a" from the position $X_n$ to a central pixel of the CCD 39, for instance, based on a pixel number "m" shown in FIG. 8. It should be noted that the central pixel of the CCD 39 included in the left optical unit 27L is detected based on pixel numbers of pixels corresponding to the black marks M1, M2, M3 and M4, for instance. The position $X_n$ corresponds to an emission/incident angle $\theta_n$ of the probe ray $L_n$, and thus the emission/incident angle $\theta_n$ can be obtained by obtaining the position $X_n$. The emission/incident angle $\theta_n$ is expressed as a function of the distance "a" as follows.

$$\theta_n = \tan^{-1}(a/f) \tag{1}$$

It should be noted that the distance "f" is the focal length of the cylindrical lens 38. The emission/incident angle $\theta_n$ and the distance "a" in the left optical unit 27L will be expressed respectively as an emission/incident angle $\theta_{nL}$ and a distance $X_{nL}$ from now on. Similarly, the emission/incident angle $\theta_n$ and the distance "a" in the right optical unit 27R will be expressed respectively as an emission/incident angle $\theta_{nR}$ and a distance $X_{nR}$.

Additionally, based on a conversion coefficient "g" of geometrical relative positions of the left optical unit 27L and the coordinate input/detection area 3a shown in FIG. 7, an angle $\theta_L$ created by the pointing instrument P and the left optical unit 27L is expressed as a function of the distance $X_{nL}$ as follows.

$$\theta_L = g(\theta_{nL}); \theta_{nL} = \tan^{-1}(X_{nL}/f) \tag{2}$$

Similarly, based on a conversion coefficient "h" of geometrical relative positions of the right optical unit 27R and the coordinate input/detection area 3a shown in FIG. 7, an angle $\theta_R$ created by the pointing instrument P and the right optical unit 27R is expressed as a function of the distance $X_{nR}$ as follows.

$$\theta_R = h(\theta_{nR}); \theta_{nR} = \tan^{-1}(X_{nR}/f) \tag{3}$$

It is provided in FIG. 7 that a distance between a center of the CCD 39 included in the left optical unit 27L and a center of the CCD 39 included in the right optical unit 27R is "w". Accordingly, coordinates (x, y) of the point pointed by the pointing instrument P in the coordinate input/detection area 3a can be calculated as follows, based on triangulation.

$$x = w \cdot \tan \theta_R / (\tan \theta_L + \tan \theta_R) \tag{4}$$

$$y = w \cdot \tan \theta_L \cdot \tan \theta_R / (\tan \theta_L + \tan \theta_R) \tag{5}$$

The above equations 1 through 5 are initially stored as a part of control programs in the hard disk 46 or the recording medium 49, for example. Based on such equations, the coordinates (x, y) of the pointing instrument P are calculated as functions of the distances $X_{nL}$ and $X_{nR}$. In other words, the coordinates (x, y) are calculated by detection of a dark point on the CCD 39 of the left optical unit 27L and a dark point on the CCD 39 of the right optical unit 27R.

Figure 9:
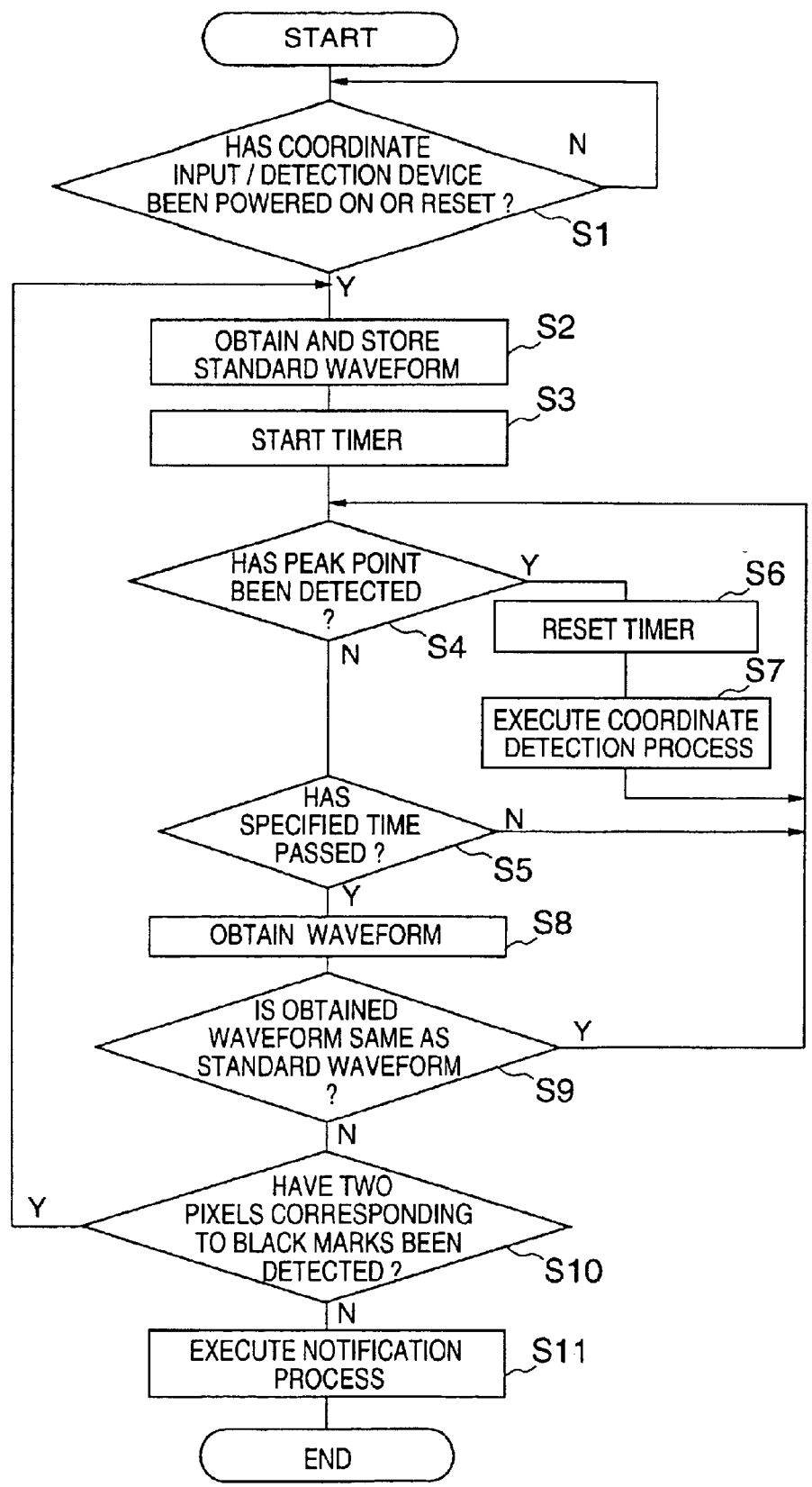
FIG. 9 is a flowchart showing summarized steps performed by the coordinate input/detection device for mainly correcting an optical-unit positioning error.

A description will now be given of a process to correct an optical-unit positioning error executed by the coordinate input/detection device 3. FIG. 9 is a flowchart showing summarized steps for mainly correcting the optical-unit positioning error. At a step S1 shown in FIG. 9, if a power of the coordinate input/detection device 3 is on, or the coordinate input/detection device 3 is reset, the coordinate input/detection device 3 proceeds to a step S2. At the step S2, the coordinate input/detection device 3 starts the light source 31 provided in each of the left optical unit 27L and the right optical unit 27R, emits a fan-shaped film of rays to the coordinate input/detection area 3a, and receives the fan-shaped film of rays retro-reflected by the retro reflectors 28 at the CCD 39 included in each of the optical units 27. Subsequently, the coordinate input/detection device 3 obtains a digital waveform signal processed by the analog processing circuit 51 and the A/D converter 44 based on light-intensity distribution from the CCD 39, as a standard waveform (standard intensity waveform), and stores the standard waveform in the EEPROM 47, which is a waveform storing unit. As described above, a standard-waveform storing function is performed.

Figure 10A:
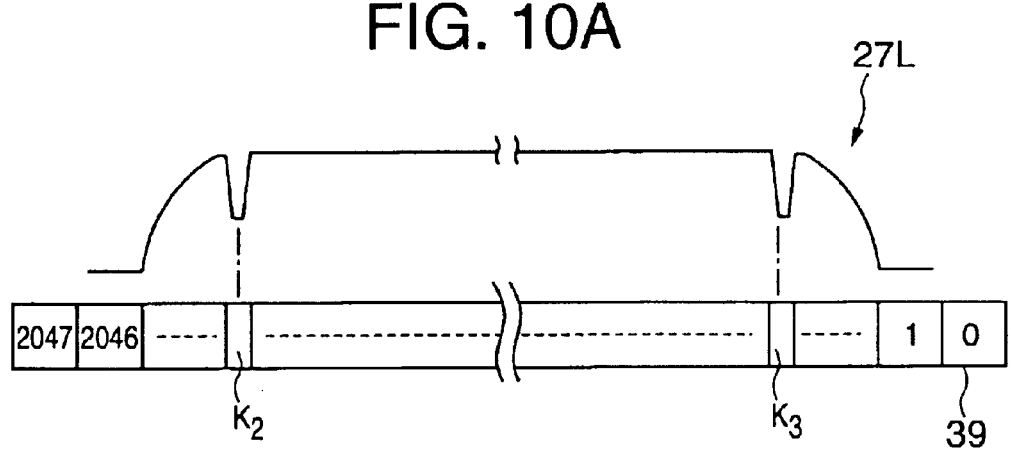
FIGS. 10A and 10B are diagrams showing digital waveform signals processed by an analog processing circuit and an A/D converter based on light-intensity distribution from the CCD.
Figure 10B:
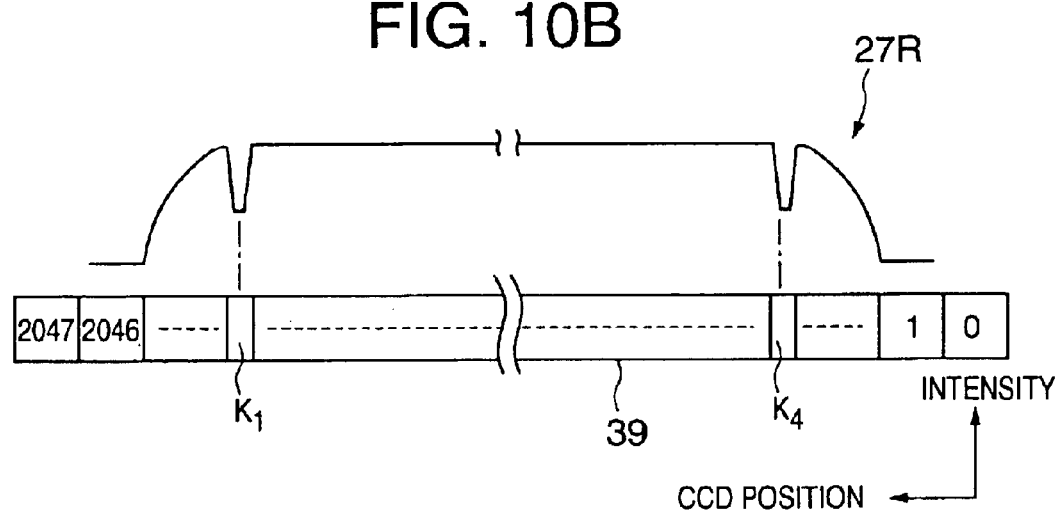

FIGS. 10A and 10B are diagrams showing the digital waveform signals processed by the analog processing circuit 51 and the A/D converter 44 based on the light-intensity distribution from the CCD 39. As described above, the black marks M1, M2, M3 and M4 having low light-reflection rates are provided between the retro reflectors 28, and near the optical units 27. Additionally, the retro reflector 28 provided on the upper side of the coordinate input/detection area 3a and the retro reflectors provided on the left and right sides of the coordinate input/detection area 3a are adjacent and perpendicular to each other. However, those retro reflectors 28 are not connected to each other. In other words, the retro reflector 28 provided on the upper side of the coordinate input/detection area 3a prevents a ray emitted from the left optical unit 27L from reaching the black mark M1, and a ray emitted from the right optical unit 27R from reaching the black mark M2. Accordingly, a ray emitted from the left optical unit 27L does not reach the black marks M1 and M4, and thus a standard waveform of the left optical unit 27L has low intensities at pixels $K_2$ and $K_3$ of the CCD 39 respectively corresponding to the black marks M2 and M3, as shown in FIG. 10A. On the other hand, a ray emitted from the right optical unit 27R does not reach the black marks M2 and M3, and thus a standard waveform of the right optical unit 27R has low intensities at pixels $K_1$ and $K_4$ of the CCD 39 respectively corresponding to the black marks M1 and M4, as shown in FIG. 10B. In other words, a light-receiving area of the CCD 39 included in the left optical unit 27L is determined by the pixels $K_2$ and $K_3$ of the CCD 39 respectively corresponding to the black marks M2 and M3, and thus a central pixel of the CCD 39 can be obtained in the left optical unit 27L. Additionally, a light-receiving area of the CCD 39 included in the right optical unit 27R is determined by the pixels $K_1$ and $K_4$ of the CCD 39 respectively corresponding to the black marks M1 and M4, and thus a central pixel of the CCD 39 can be obtained in the right optical unit 27R. As described above, the black marks M1, M2, M3 and M4 can be understood as standard marks for determining coordinates of the pointing instrument P.

At a step S3 shown in FIG. 9, the CPU 40 of the controller 10 starts the timer T. Subsequently, the CPU 40 waits until a peak point of an intensity waveform is detected at a step S4, or until the timer T counts a specified time at a step S5. If the peak point of the intensity waveform has been detected at the step S4, the CPU 40 resets the timer T at a step S6, executes the above-described coordinate detection process based on the peak point at a step S7, and proceeds to the step S4 to wait until another peak point of the intensity waveform is detected. On the other hand, if the timer T has counted the specified time at the step S5 without the peak point having been detected, the CPU 40 obtains an intensity waveform processed by the analog processing circuit 51 and the A/D converter 44 based on current light-intensity distribution from the CCD 39, at a step S8. Subsequently, the CPU 40 analyzes shapes of the intensity waveform obtained at the step S8 and the standard waveform stored in the EEPROM 47, and determines whether the shapes are the same, at a step S9. As describe above, a waveform comparing function is performed. This waveform comparing function or a shape analyzing process includes steps of focusing on the pixels $K_2$ and $K_3$ of the CCD 39 respectively corresponding to the black marks M2 and M3 shown in FIG. 10A, and analyzing whether the pixels corresponding to the black marks M2 and M3 in the standard waveform and the pixels corresponding to the black marks M2 and M3 in the intensity waveform obtained at the step S8 are the same, for instance, in a case of the left optical unit 27L.

If the CPU 40 detects that the pixels corresponding to the black marks M2 and M3 in the standard waveform and the pixels corresponding to the black marks M2 and M3 in the intensity waveform obtained at the step S8 are the same in the left optical unit 27L at the step S9, the CPU 40 understands that there is no positioning error, and proceeds to the step S4 waiting for detection of a peak point in the intensity waveform. On the other hand, if the CPU 40 detects that the pixels corresponding to the black marks M2 and M3 in the standard waveform and the pixels corresponding to the black marks M2 and M3 in the intensity waveform obtained at the step S8 are different in the left optical unit 27L at the step S9, the CPU 40 proceeds to a step S10, and checks whether two pixels of the CCD 39 included in the left optical unit 27L have been detected, the two pixels respectively corresponding to the black marks M2 and M3. If the CPU 40 determines that the two pixels corresponding to the black marks M2 and M3 have been detected at the step S10, the CPU 40 proceeds to the step S2, and obtains a digital waveform signal processed by the analog processing circuit 51 and the A/D converter 44 based on the light-intensity distribution from the CCD 39, as a new standard waveform, and stores the new standard waveform in the EEPROM 47. As described above, a standard-waveform restoring function is executed. By obtaining the standard waveform again based on detection of the two pixels corresponding to the black marks M2 and M3, mechanical or physical positioning adjustment becomes unnecessary even if a positioning error occurs on the left optical unit 27L, since a number of pixels from a point pointed by the pointing instrument P to the central pixel on the CCD 39 included in the left optical unit 27L is calculated based on the two pixels corresponding to the black marks M2 and M3.

If the CPU 40 determines that the two pixels corresponding to the black marks M2 and M3 have not been detected for the left optical unit 27L at the step S10, the CPU 40 proceeds to a step S11, and executes a notification process. If the two pixels corresponding to the black marks M2 and M3 have not been detected on the CCD 39 of the left optical unit 27L, the black marks M2 and M3, that are standards for detecting coordinates, are located outside the light-receiving area of the CCD 39 detecting rays in the coordinate input/detection area 3a. In such a condition, the coordinate input/detection device 3 cannot execute an accurate coordinate detection process, and thus urges a user to fix a positioning error such as an installation angle of the left optical unit 27L, for example, by displaying a message "An optical unit is off an installation position. Please adjust the optical unit." on the displaying surface 2a of the PDP 2. A method of notifying the user is not limited to displaying the message. The coordinate input/detection device 3 may notify the user by use of a speaker, a blinking lamp, or a combination of the message, speaker and the lamp. It should be noted that the description has been given of the process to correct an optical-unit positioning error for the left optical unit 27L. However, the coordinate input/detection device 3 can perform the process to correct a positioning error of the right optical unit 27R similarly.

As described above, a waveform of a light-receiving signal corresponding to light-intensity distribution of rays received by the CCD 39 is compared with a standard waveform at fixed timing. It is understood that a positioning error is occurring to the CCD 39 because of shock or vibration if shapes of the waveform of the light-receiving signal and the standard waveform are different from each other. Consequently, a standard-waveform storing process is performed again, thereby storing a new standard waveform in the EEPROM 47. Accordingly, even if the positioning error is occurring to the CCD 39 because of the shock or the vibration, no positioning error occurs to relative positions of a peak point in light-intensity distribution generated by a black mark M being a standard for the coordinate detection process and a peak point in the light-intensity distribution corresponding to the pointing instrument P inserted to the coordinate input/detection area 3a, by defining a waveform of a light-receiving signal corresponding to light-intensity distribution of rays received by the CCD 39 having the positioning error as the standard waveform. As a result, the coordinate input/detection device 3 can prevent misdetection of coordinates of the pointing instrument P inserted to the coordinate input/detection area 3a.

Additionally, in a case in which the coordinate input/detection device 3 is moved while it is powered on, the coordinate input/detection device 3 executes the above-described comparison, and stores a new standard waveform in the EEPROM 47 even if a positioning error of the CCD 39 occurs by shock or vibration, thereby preventing misdetection of coordinates of the pointing instrument P. Furthermore, if the waveform compared with the standard waveform does not include the peak point included in the standard waveform, a black mark corresponding to the peak point is off a light-receiving area of the CCD 39, and thus the coordinate input/detection device 3 cannot detect the coordinates of the pointing instrument P. In such a case, the coordinate input/detection device 3 notifies the positioning error of the CCD 39 to a user, thereby definitely preventing misdetection of the coordinates.

In the first embodiment, the electronic blackboard system 1 includes the coordinate input/detection device 3 with the PDP 2 as a display device. However, the display device is not limited to the PDP 2. For example, a CRT (Cathode Ray Tube), an LCD (Liquid Crystal Display), a front-projecting type projector or a back-projecting type projector may be utilized as the display device. Additionally, a writing board such as a blackboard or a whiteboard may be attached to the coordinate input/detection device 3.

Figure 11:
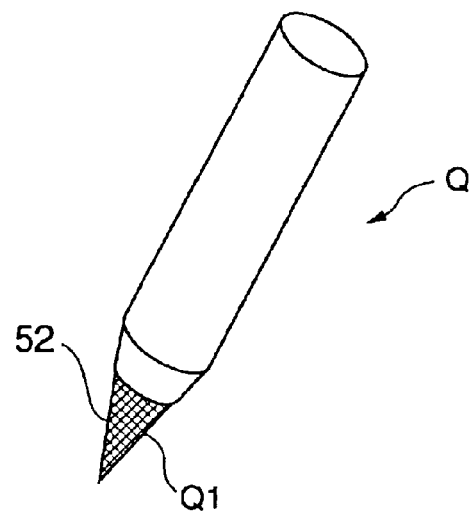
FIG. 11 is a squint diagram showing a pointing instrument utilized in a coordinate input/detection device according to a second embodiment of the present invention.
Figure 12:
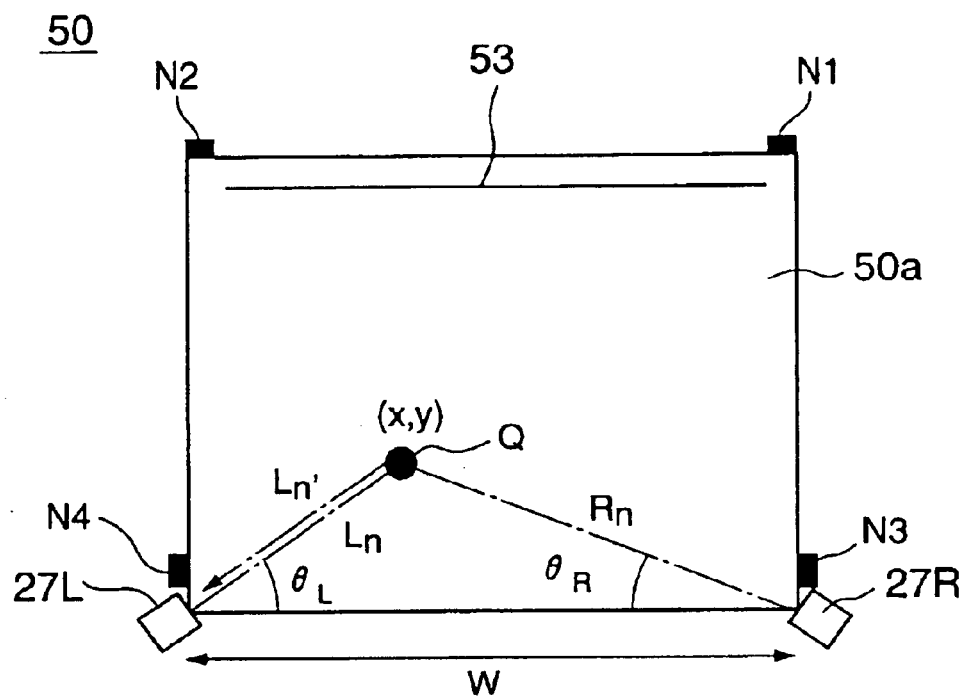
FIG. 12 is a diagram showing a front view of a point pointed by the pointing instrument in a coordinate input/detection area of the coordinate input/detection device according to the second embodiment.
Figure 13:
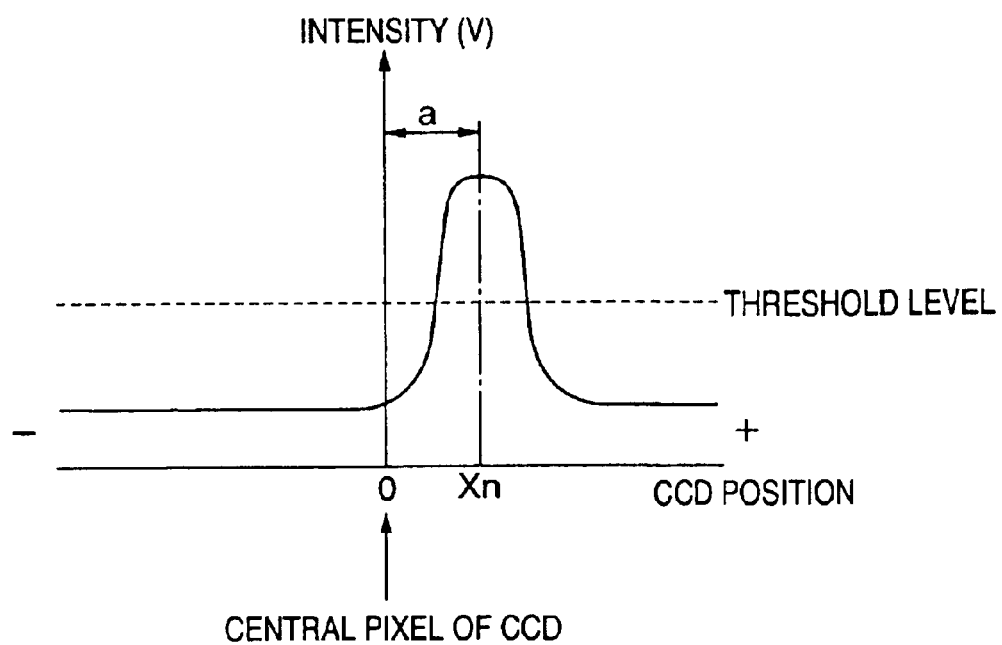
FIG. 13 is a diagram showing a light-intensity waveform outputted from the CCD, according to the second embodiment.

A description will now be given of a coordinate input/detection device according to a second embodiment of the present invention with reference to FIGS. 11, 12 and 13. A unit in the second embodiment equal to a unit having been described in the first embodiment has the same unit number as the unit having been described in the first embodiment, and a description of the unit is omitted in the second embodiment. A coordinate input/detection device 50 according to the second embodiment utilizes a different coordinate detection method from the coordinate input/detection device 3 according to the first embodiment. To be concrete, the coordinate input/detection device 3 utilizes a light shading or blocking method, whereas the coordinate input/detection device 50 utilizes a light reflecting method. FIGS. 11 and 12 are respectively a squint diagram showing a pointing instrument Q utilized in the coordinate input/detection device 50, and a diagram showing a front view of a point pointed by the pointing instrument Q in a coordinate input/detection area 50a of the coordinate input/detection device 50. The pointing instrument Q shown in FIG. 11 includes a pointing part $Q_1$ used for pointing a point in the coordinate input/detection area 50a shown in FIG. 12, the pointing part $Q_1$ having a retro reflector 52. The retro reflector 52 is, for instance, formed by arrangement of a large number of conical corner cubes, and reflects an incident ray to a fixed direction without depending on an incident angle of the ray. For example, the probe ray $L_n$ emitted from the left optical unit 27L is reflected by the retro reflector 52 provided on the pointing instrument Q, and is received as a retro-reflected ray $L_n'$ traveling the same path as the probe ray $L_n$ by the left optical unit 27L. Therefore, the coordinate input/detection device 50 according to the second embodiment does not need to provide the retro reflectors 28 around the coordinate input/detection area 50a, whereas the coordinate input/detection device 3 according to the first embodiment needs to provide the retro reflectors 28 around the coordinate input/detection area 3a except the lower side thereof. Instead, the coordinate input/detection device 50 provides retro reflectors N1, N2, N3 and N4 at positions where the coordinate input/detection device 3 places the black marks M1, M2, M3 and M4. Additionally, a blocking plate 53 is provided in the coordinate input/detection area 50a for preventing a ray emitted from the left optical unit 27L from reaching the retro reflector N1, and a ray emitted from the right optical unit 27R from reaching the retro reflector N2.

In a case in which the pointing part $Q_1$ of the pointing instrument Q having the retro reflector 52 is inserted at coordinates (x, y) in the coordinate input/detection area 50a, the probe ray $L_n$ among a plurality of rays emitted from the left optical unit 27L is reflected by the pointing part $Q_1$ to be the retro-reflected ray $L_n'$. Subsequently, the retro-reflected ray $L_n'$ is received by the CCD 39 of the left optical unit 27L. As a result, a position $X_{nL}$ on the CCD 39 corresponding to the retro-reflected ray $L_n'$ becomes an area with a high intensity (a bright point). In details, if the probe ray $L_n$ is reflected by the pointing part $Q_1$ of the pointing instrument Q, a peak point appears in a light-intensity waveform outputted from the CCD 39, as shown in FIG. 13. Accordingly, even if the coordinate input/detection device 50 utilizing the light reflecting method is applied to the electronic blackboard system 1, a peak point appears in the light-intensity waveform, and thus the coordinate input/detection device 50 can execute the coordinate detection process based on the peak point appearing in the light-intensity waveform similarly to the coordinate input/detection device 3.

Additionally, since the retro reflectors N1, N2, N3 and N4 are provided instead of the black marks M1, M2, M3 and M4 in the coordinate input/detection area 50a, probe rays emitted from the left optical unit 27L and the right optical unit 27R are reflected only by the retro reflectors N1, N2, N3 and N4 in a case in which the pointing instrument Q is not inserted to the coordinate input/detection area 50a. Consequently, peak points corresponding to the retro reflectors N1, N2, N3 and N4 appear in light-intensity waveforms, and thus the coordinate input/detection device 50 can perform the process to correct optical-unit positioning errors, similarly to the coordinate input/detection device 3.

Figure 14:
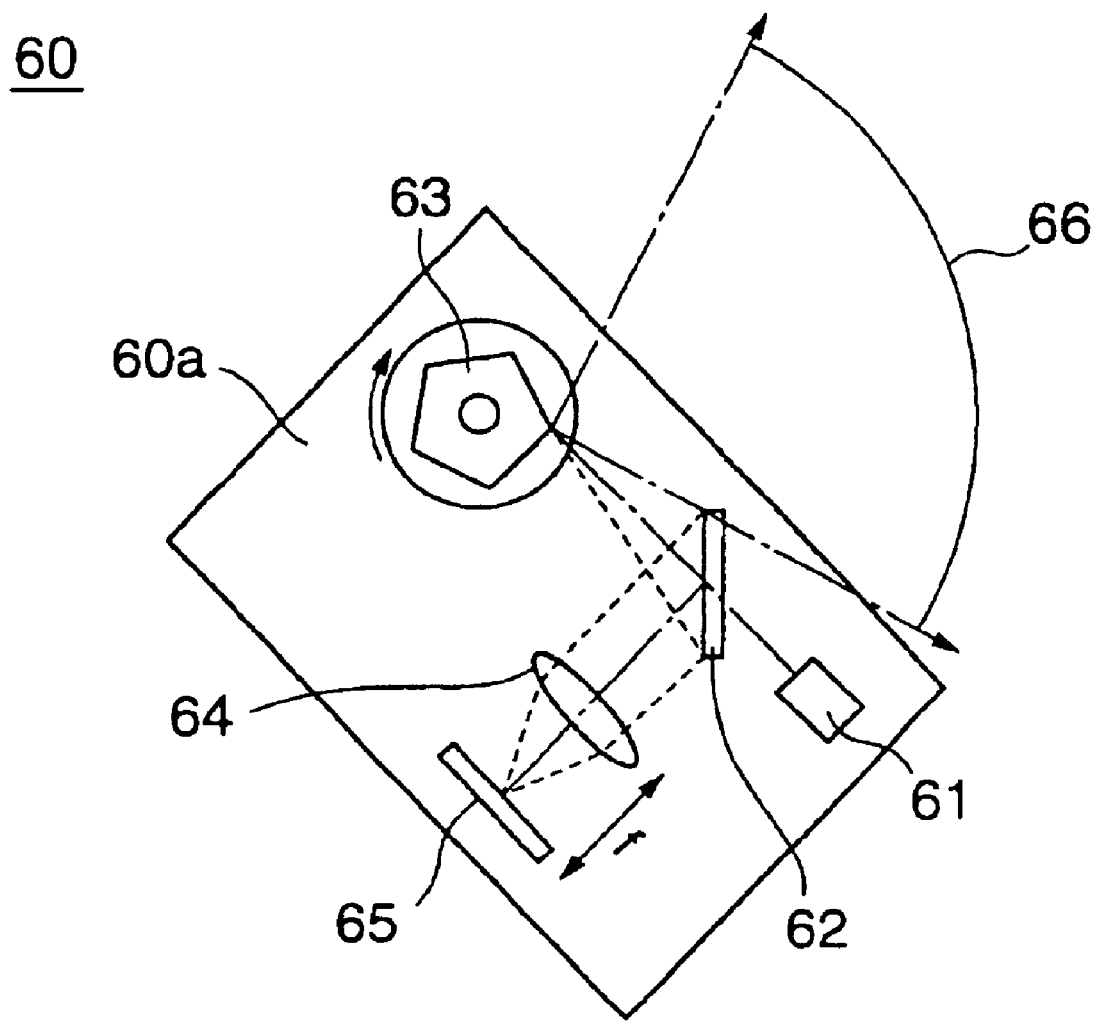
FIG. 14 is a diagram showing a summarized floor plan of an optical unit according to a third embodiment of the present invention.

A description will now be given of an optical unit according to a third embodiment of the present invention with reference to FIG. 14. Each optical unit 27 according to the first and second embodiments forms a coordinate input/detection area by emitting a fan-shaped film of rays, whereas an optical unit according to the third embodiment includes a rotating scanner system such as a polygonal mirror, and forms the coordinate input/detection area by radiating rays (beams) emitted from a light source by use of the rotating scanner system. FIG. 14 is a diagram showing a summarized floor plan of an optical unit 60 according to the third embodiment. The optical unit 60 shown in FIG. 14 includes a floodlight unit 60a and a light-receiving device 65. The floodlight unit 60a includes a LD (Laser Diode) 61, a half mirror 62, a polygonal mirror 63 and a light-collecting lens 64. The LD 61 is a light source emitting laser beams (rays) by using an operating circuit not shown in the figures. The light-receiving device 65 includes a CCD provided at a distance "f", that is, a focal length of the light-collecting lens 64, away from the light-collecting lens 64. The optical unit 60 passes laser beams emitted from the LD 61 through the half mirror 62, and reflects the laser beams sequentially and radially by the polygonal mirror 63 rotated by a pulse motor not shown in the figures, thereby repeating radial emission of the laser beams. As described above, the optical unit 60 creates a coordinate input/detection area 66 shown in FIG. 14.

In a case in which the optical unit 60 is substituted for the optical unit 27 in the coordinate input/detection devices 3 and 50, a peak point appears in a light-intensity waveform outputted from the CCD 65 by the pointing instrument P blocking a ray or by the pointing instrument Q reflecting the ray. Each of the coordinate input/detection devices 3 and 50 detects a pulse number of the pulse motor rotating the polygonal mirror 63 based on the peak point in the light-intensity waveform outputted from the CCD 65, obtains an emission angle of the ray blocked by the pointing instrument P or reflected by the pointing instrument Q for each optical unit 60 in accordance with the pulse number of the pulse motor, and detects coordinates of the pointing instrument P or Q by triangulation based on the emission angle. Additionally, since the peak point appears in the light-intensity waveform in the case in which the optical unit 60 is applied to the coordinate input/detection device 3 or 50, the coordinate input/detection device 3 or 50 can execute the process to correct a positioning error of the optical unit 60 based on the peak point appearing in the light-intensity waveform, similarly to the process to correct a positioning error of the optical unit 27.

In the above-described embodiments, the controller 10 is provided separately from the computer 5. Instead, the controller 10 may be included in the computer 5, and the computer 5 may be operated as the controller 10. Additionally, the coordinate input/detection device 3 or 50 is included in the electronic blackboard system 1 in the embodiments. However, the coordinate input/detection device 3 or 50 may have a structure so that the coordinate input/detection device 3 or 50 is detachable from a displaying device. Furthermore, in the embodiments, a floppy disk, a hard disk, an MO disk, a memory card, and optical disks including a CD-ROM, a CD-R, a CD-R/W, a DVD-ROM and a DVD-RAM are utilized as the recording mediums 26 and 49 including various program codes and control programs. However, the recording mediums 26 and 49 are not limited to the above-described recording mediums that are divided from a computer. For example, a recording medium storing or temporally storing a program after downloading the program transmitted through a LAN or the Internet is included in the recording mediums 26 and 49.

The above description is provided in order to enable any person skilled in the art to make and use the invention and sets forth the best mode contemplated by the inventors of carrying out the invention.

The present invention is not limited to the specially disclosed embodiments and variations, and modifications may be made without departing from the scope and spirit of the invention.

The present application is based on Japanese Priority Application No. 2000-059917, filed on Mar. 6, 2000, the entire contents of which are hereby incorporated by reference.

What is claimed is:

1. A coordinate input/detection device provided with a coordinate input area, comprising:
   a light-emitting unit emitting a plurality of rays to the coordinate input area;
   a light-receiving unit receiving said plurality of rays reflected by sides of the coordinate input area, and obtaining intensity distribution of said plurality of rays;
   a standard mark provided at a fixed position in the coordinate input area so that said light-receiving unit generates a peak intensity corresponding to said standard mark in the intensity distribution; and
   a coordinate detection unit detecting coordinates of a pointing instrument inserted into the coordinate input area based on the intensity distribution responsive to the insertion of said pointing instrument by using a position of the peak intensity as a reference position, wherein
   the position of the peak intensity used as a reference position is updated periodically at fixed timing.

2. The coordinate input/detection device as claimed in claim 1, wherein
   said fixed timing is timing at which a fixed period has passed being in a condition that said coordinate detection unit does not detect the coordinates.

3. The coordinate input/detection device as claimed in claim 1, further comprising:
   a notification unit notifying a user of an error if said peak intensity is not present in the intensity distribution.

4. A coordinate input/detection device provided with a coordinate input area, comprising:
   a light-emitting unit emitting a plurality of rays to the coordinate input area;
   a light-receiving unit receiving said plurality of rays reflected by sides of the coordinate input area, thereby obtaining intensity distribution of said plurality of rays, and outputting a signal corresponding to the intensity distribution;
   a standard mark provided at a fixed position in the coordinate input area so that said light-receiving unit generates a peak intensity corresponding to said standard mark in the intensity distribution;
   a storage unit;
   a standard-waveform storing unit storing a first waveform of the signal including a peak point corresponding to a position of the peak intensity as a standard waveform in said storage unit;
   a coordinate detection unit detecting coordinates of a pointing instrument inserted into the coordinate input area based on the intensity distribution responsive to the insertion of said pointing instrument by using the peak point of the standard waveform as a reference point; and
   a waveform comparing unit comparing a second waveform of the signal with said standard waveform at fixed timing, wherein
   said standard-waveform storing unit stores a new waveform of the signal outputted by said light-receiving unit as the standard waveform in said storage unit in a case in which said second waveform is not equal to said standard waveform.

5. The coordinate input/detection device as claimed in claim 4, wherein
   said fixed timing is timing at which a fixed period has passed being in a condition that said coordinate detection unit does not detect the coordinates.

6. The coordinate input/detection device as claimed in claim 4, further comprising:
   a notification unit notifying a user of an error if said waveform comparing unit detects that said second waveform does not include the peak point included in said standard waveform.

7. The coordinate input/detection device as claimed in claim 4, wherein
   said sides of the coordinate input area are made of retro-reflecting material.

8. The coordinate input/detection device as claimed in claim 4, wherein
   said pointing instrument and said standard mark are made of retro-reflecting material.

9. An electronic blackboard system, comprising:
   an electronic blackboard unit whose displaying surface and writing surface include a displaying unit and a coordinate input/detection unit respectively; and
   a control unit executing a displaying control of said displaying unit based on a signal outputted from said coordinate input/detection unit, wherein
   said coordinate input/detection unit, comprises:
      a coordinate input area corresponding to a displaying surface of said displaying unit;
      a light-emitting unit emitting a plurality of rays to the coordinate input area;
      a light-receiving unit receiving said plurality of rays reflected by sides of the coordinate input area, thereby obtaining intensity distribution of said plurality of rays, and outputting the signal corresponding to the distribution;
      a standard mark provided at a fixed position in the coordinate input area so that said light-receiving unit generates a peak intensity corresponding to said standard mark in the intensity distribution;
      a coordinate detection unit detecting coordinates of a pointing instrument inserted to the coordinate input area, based on the intensity distribution responsive to the insertion of said pointing instrument by using a position of the peak intensity as a reference position;
      a storage unit;
      a standard-waveform storing unit storing a first waveform of the signal including the peak point as a standard waveform in said storage unit;
      a waveform comparing unit comparing a second waveform of the signal with said standard waveform at fixed timing, wherein
      said standard-waveform storing unit stores a new waveform of the signal outputted by said light-receiving unit as the standard waveform in said storage unit in a case in which said second waveform is not equal to said standard waveform.

10. An electronic blackboard system, comprising:
    an electronic blackboard unit whose writing surface includes a writing board to which handwriting information is inputted, and a coordinate input/detection unit; and
    a control unit controlling the handwriting information inputted to said writing board based on a signal outputted from said coordinate input/detection unit, wherein
    said coordinate input/detection unit, comprising:
       a coordinate input area corresponding to a writing surface of said writing board;
       a light-emitting unit emitting a plurality of rays to the coordinate input area;

a light-receiving unit receiving said plurality of rays reflected by sides of the coordinate input area, thereby obtaining intensity distribution of said plurality of rays, and outputting the signal corresponding to the intensity distribution;

a standard mark provided at a fixed position in the coordinate input area so that said light-receiving unit generates a peak intensity corresponding to said standard mark in the intensity distribution;

a coordinate detection unit detecting coordinates of a pointing instrument inserted to the coordinate input area; based on the intensity distribution responsive to the insertion of said pointing instrument by using a position of the peak intensity as a reference position;

a storage unit;

a standard-waveform storing unit storing a first waveform of the signal including the peak point as a standard waveform in said storage unit;

a waveform comparing unit comparing a second waveform of the signal with said standard waveform at fixed timing, wherein said standard-waveform storing unit stores a new waveform of the signal outputted by said light-receiving unit as the standard waveform in said storage unit in a case in which said second waveform is not equal to said standard waveform.

11. A method of detecting a positioning error of a light-receiving unit included in a coordinate input/detection device provided with a coordinate input area, said coordinate input/detection device including a light-emitting unit emitting a plurality of rays to the coordinate input area; said light-receiving unit receiving said plurality of rays reflected by sides of the coordinate input area, and obtaining intensity distribution of said plurality of rays; a coordinate detection unit detecting coordinates of a pointing instrument inserted to the coordinate input area, based on the intensity distribution responsive to the insertion of said pointing instrument by using a position of the peak intensity as a reference position, and a standard mark provided at a fixed position in the coordinate input area so that light-receiving unit generates a peak intensity corresponding to said standard mark in the intensity distribution, said method comprising:

detecting the positioning error of said light-receiving unit by detecting a shift in a position of the peak intensity in the intensity distribution at fixed timing.

12. The method as claimed in claim 11, wherein said fixed timing is timing at which a fixed period has passed being in a condition that said coordinate detection unit detection unit does not detect the coordinates.

13. The method as claimed in claim 11, further comprising:

notifying a user of an error if said peak intensity is not present in the intensity distribution.

14. A method of correcting a positioning error of a light-receiving unit included in a coordinate input/detection device provided with a coordinate input area, said coordinate input/detection device, comprising: a light-emitting unit emitting a plurality of rays to the coordinate input area; said light-receiving said plurality of rays reflected by sides of the coordinate input area, thereby obtaining intensity distribution of said plurality of rays, and outputting a signal corresponding to the intensity distribution; a standard mark provided at a fixed position in the coordinate input area so that said light-receiving unit generates a peak intensity corresponding to said standard mark in the intensity distribution; a coordinate detection unit detecting coordinates of a pointing instrument inserted to the coordinate input area, based on the intensity distribution responsive to the insertion of said pointing instrument by using a position of the peak intensity as a reference position; and a storage unit, said method comprising:

storing a first waveform of the signal including the peak point as a standard waveform in said storage unit;

comparing a second waveform of the signal with said standard waveform at fixed timing; and storing a new waveform of the signal outputted by said light-receiving unit as the standard waveform in said storage unit in a case in which said second waveform is not equal to said standard waveform.

15. The method as claimed in claim 14, wherein said fixed timing is timing at which a fixed period has passed being in a condition that said coordinate detection unit does not detect the coordinates.

16. The method as claimed in claim 14, further comprising:

a user of an error in a case of detecting that said second waveform does not include the peak point included in said standard waveform.

17. A recording medium readable by a coordinate input/detection device, tangibly embodying a program of instructions executable by the coordinate input/detection device to correct a positioning error of a light-receiving unit included in the coordinate input/detection device provided with a coordinate input area, said coordinate input/detection device, comprising: a light-emitting unit emitting a plurality of rays to the coordinate input area; said light-receiving unit receiving said plurality of rays reflected by sides of the coordinate input area, thereby obtaining intensity distribution of said plurality of rays, and outputting a signal corresponding to the intensity distribution; a standard mark provided at a fixed position in the coordinate input area so that said light-receiving unit generates a peak intensity corresponding to said standard mark in the intensity distribution; a coordinate detection unit detecting coordinates of a pointing instrument inserted to the coordinate input area, based on the intensity distribution responsive to the insertion of said pointing instrument by using a position of the peak intensity as a reference position; and a storage unit, said program including:

storing a first waveform of the signal including the peak point as a standard waveform in said storage unit;

comparing a second waveform of the signal with said standard waveform at fixed timing; and storing a new waveform of the signal outputted by said light-receiving unit as the standard waveform in said storage unit in a case in which said second waveform is not equal to said standard waveform.

18. The recording medium as claimed in claim 17, wherein said fixed timing is timing at which a fixed period has passed being in a condition that said coordinate detection unit does not detect the coordinates.

19. The recording medium as claimed in claim 17, wherein said program further comprising notifying a user of an error in a case of detecting that said second waveform does not include the peak point included in said standard waveform.

* * * * *